United States Patent [19]

Kirby

[11] Patent Number: 4,703,886

[45] Date of Patent: Nov. 3, 1987

[54] HEAT/COOL COMFORT CONTROLLER

[76] Inventor: Chris Kirby, 111 Blasdale Ave., Ottawa, Ontario K1K 0C1, Canada

[21] Appl. No.: 805,793

[22] Filed: Dec. 6, 1985

[51] Int. Cl.$^4$ ............................................... B01F 3/02
[52] U.S. Cl. .................................. 236/44 E; 73/336.5; 374/184; 165/19
[58] Field of Search ............... 236/44 E, 44 C, 46 F; 165/19; 374/109, 142, 184; 73/336.8, 336.3; 340/602

[56] References Cited

U.S. PATENT DOCUMENTS

3,443,121  5/1969  Weisbrod .......................... 307/117
3,546,612  12/1970  Day ................................. 340/602
4,449,188  5/1984  Unoguchi et al. ............... 165/21 X Primary Examiner—William E. Wayner

[57] ABSTRACT

An atmospheric thermostat having an auxiliary humidity input, for controlling heating and cooling so as to provide a controlled temperature modified by the humidity present thereby to provide a desirable comfort level to humans within the controlled environment. The thermostat is of the type which controls heating and cooling equipment through the use of electronic logic or a microcomputer. The thermostat operates the controls of the heating and cooling equipment and, where necessary, humidifying or dehumidifying equipment.

14 Claims, 6 Drawing Figures

HEAT/COOL COMFORT CONTROLLER

BACKGROUND OF THE INVENTION

This invention relates to a thermometer having an output signal which is processed in a computer, the said output being modified by a signal from a humidity sensor.

More recently temperature controlling thermostats have become fairly sophisticated with the incorporation of micro-computers. The micro-computers have enabled daily programming of say, four different selected temperatures, overriding of such temperature selections for week-end operation and of resuming of programmed operation after several weeks of operation at a single selected temperature, as for example, during a vacation period. A thermostat having the foregoing features is manufactured by Valera Electronics Inc., ® of Ottawa, Ontario, Canada and sold under the trade mark "ENERSTAT". TM The "ENERSTAT" will now be well known to those skilled in the art. Another feature of the ENERSTAT TM is that it computes burn time. This eliminates droop which results from the use of more conventional anticipation methods.

It has been recognized that ambient temperature per se is not the sole criterion in the attainment of comfort. The humidity of the air has a corresponding effect on comfort. It has been known for many years that humans feel comfortable in light clothing, over a narrow range of temperatures, but the range of temperatures is significantly modified by humidity. When humidity is low there is excessive evaporation from the skin surface, and as a result the body is cooled and the apparent ambient temperature is lower.

An American Society of Heating and Air Conditioning Engineers (ASHAE) comfort chart indicates the temperature and humidity zones in which most persons feel relatively comfortable. The foregoing discussion of desirable comfort conditions will be known to those skilled in the art and forms no part of the present invention.

SUMMARY OF THE INVENTION

Reverting to the electronic thermostat, the present invention enables a fairly simple addition to a programmable type of thermostat. This enables a manufacturer to sell either a straight thermostat or the present humidity modified thermostats both utilizing the same micro-computer. However, the invention has application where a humidistat alone is required.

It is a feature of one object of the invention to provide a heat/cool programmable thermostat wherein the temperature control point is modified by a humidity input.

It is a feature of another aspect of the invention to provide a heat/cool thermostat which may utilize the same micro-computer as in a programmable thermostat.

It is a feature of another aspect of the invention to provide a micro-computer type humidity indicator or a programmable humidistat.

BRIEF DESCRIPTION OF THE DRAWINGS

Preferred embodiments of the invention will now be described with reference to the accompanying drawings, in which.

DETAILED DESCRIPTION OF PREFERRED EMBODIMENTS

Figure 1:
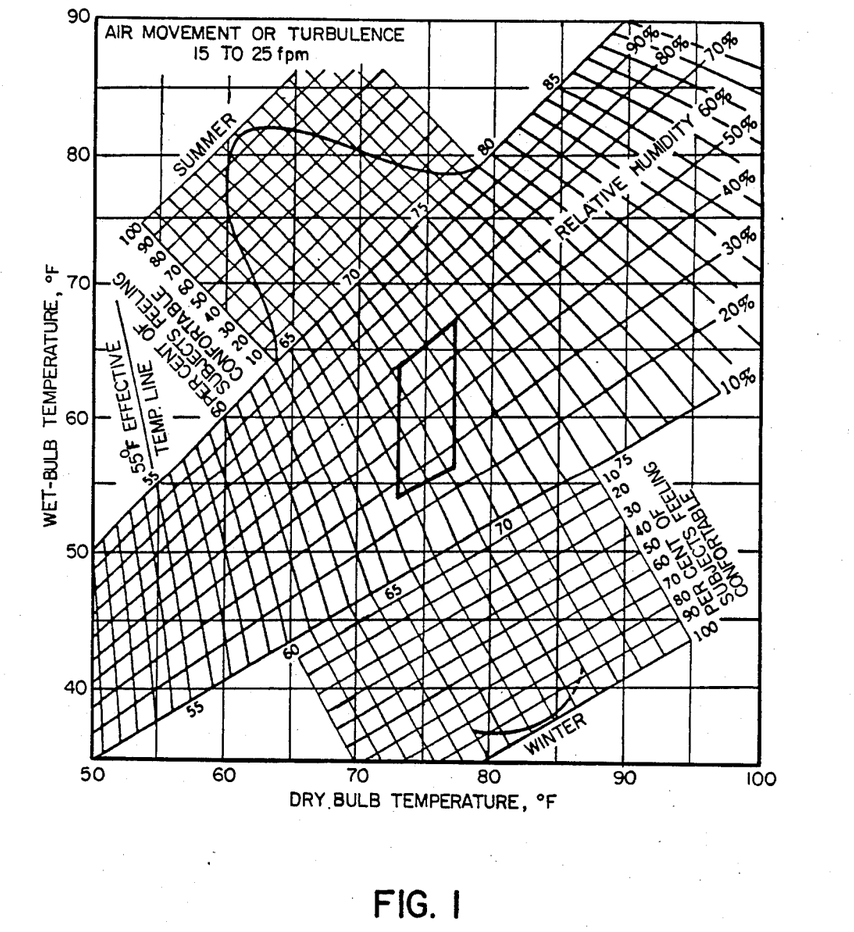
FIG. 1 is a chart of wet-bulb v. dry-bulb temperatures indicating the respective relative humidities corresponding thereof, and the resultant effective temperature.

With reference to FIG. 1, the chart indicates "comfort" conditions, for various wet and dry bulk readings, with an air movement of about 15-25 feet per minute.

An arbitrary index, known as the effective temperature, is the degree to which a human body feels the warmth or cold in response to the air temperature, moisture content and air motion. The diagonal temperature lines represent instant effective temperature. It will be observed that several combinations of wet and dry bulb temperatures with different relative humidities produce the same effective temperature. The curves at the top and bottom of the chart indicate the percentage of persons feeling comfortable for various effective temperatures. For example, about 98% of persons feel comfortable at an effective temperative of 71° F., in summer, and 97.7% at an effective temperature at 68° F. in winter. Other aspects of the comfort requirements will be obvious to those skilled in the art.

As previously mentioned, a programmable thermostat of the type sold under the trade mark "ENERSTAT", requires an input which is pulse-width modulated. The computer per se forms no part of the present invention.

Figure 2:
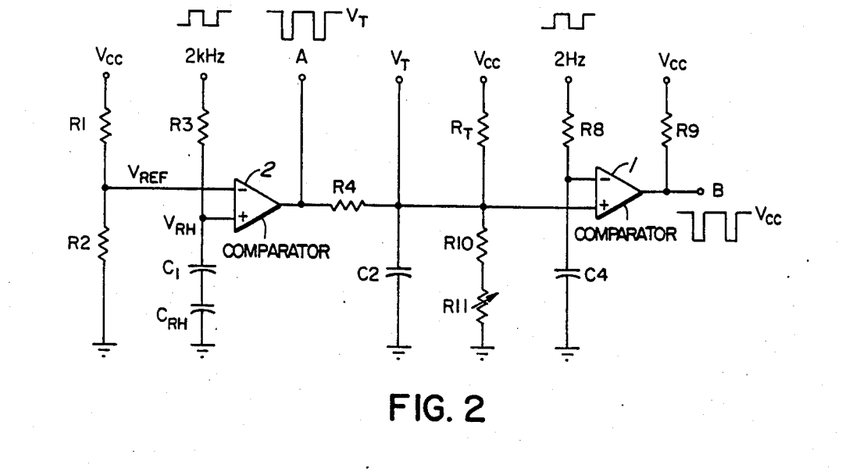
FIG. 2 is a circuit diagram which includes a capacitive humidity sensing element and a logarithmic resistive temperature sensor.

Referring now to FIG. 2, a temperature comparator 1 is provided with a low frequency square shaped input through resister $R_8$ to the negative input terminal thereof. The low frequency input, of say 2 Hz, is selected as it provides a longer pulse width so that computer has time to measure the resultant pulse width more accurately. The said resultant pulse width modulated output is provided at output terminal B which forms the input to the micro-computer. This output from terminal B in effect modulates a steady supply from $V_{cc}$ through resister $R_9$. The 2 Hz pulses applied to $R_8$ in series with $C_4$ provide a reference wave form at their junction to the negative terminal of comparator 1.

A temperature sensing resister RT. is connected to receive Vcc and Vcc is potentially divided by resistor RT, resistor R10 and patentiometer R11 to provide a signal to the positive terminal of comparator 1 and constitutes a temperature variable input, $V_T$ to the comparator 1. As previously mentioned the output from terminal B provides the input to a suitably programmed computer thermostat. A feature of this circuit is that it maintains the pulse width which is proportional to temperature, independent of variations of $V_{cc}$.

As previously discussed, the present invention modifies the temperature measurement of a suitably programmed computer thermostat so as to optimize comfort by applying an adjustment which is a function of the humidity.

With electronic thermostats there is a wide range of possible temperature detection means available. The most common are based on a change in resistance of a sensor with temperature; many other sensing elements are available some of which may be applicable to the concept outlined in this invention.

To apply temperature information to the computer, it is necessary to provide the information in a form which the computer will accept. This could be based, for example, on a thermocouple generating a voltage which is converted to a digital form through an Analog to Digital converter, thereby informing the computer of the temperature by means of a digital code, or one might communicate temperature to a computer in the form of frequency, asking the computer to determine the frequency and calculate the related temperature.

In the present invention temperature information is supplied to the computer in the form of a pulse width. The pulse is generated by means of a waveform which operates on the biased comparator (on and off) in a temperature dependent manner; the width of the resultant pulse at the output B of the comparator being temperature related and passed to the computer. The approach has the advantage of simplicity and, in addition, the waveform applied to the comparator 1 is adjusted to compensate for non-linearity of the detector and is independent of variations in $V_{cc}$.

Referring again to FIG. 2, there is shown a DC supply Vcc through resistors R1 and R2 to provide a reference voltage, $V_{ref}$, to the negative input to a comparator 2.

A square wave supply is applied via resistor R3 to the positive terminal of comparator 2. The shape of a square wave signal is modified by the network R3 and $C_{RH}$ and applied to the biased comparator 2. As the value of $C_{RH}$ changes with humidity the pulse appearing at output 'A' will vary in width (see FIG. 3). If output 'A' is to be used as a separate humidity output the value of R2 must be adjusted for calibration purposes.

Figure 3:
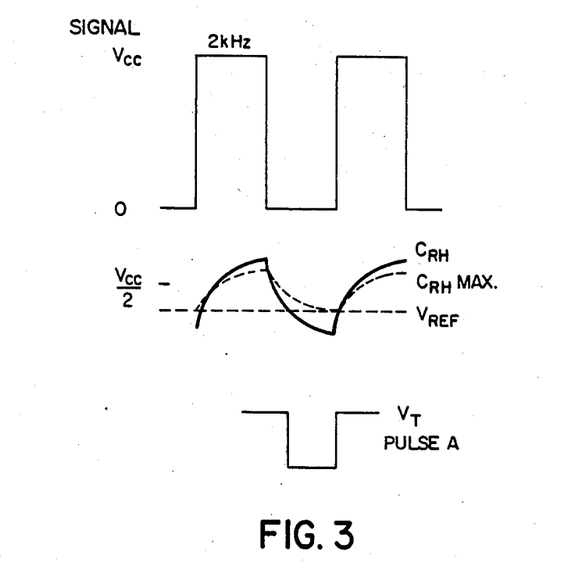
FIG. 3 is a diagram which indicates the change in pulse width, due to changes in humidity in response to a linear capacitive humidity sensor.

FIG. 3 indicates the change in pulse width at the output of comparator 2 as a function of the change in relative humidity as determined by $C_{RH}$.

It can be shown that these changes are in accordance with the following equation:

$$\frac{\Delta \text{ pulse width}}{\text{period}} = \frac{1}{2} \frac{\Delta C_{RH}}{C_{RH}} \text{ (max)}$$

It is, of course, desirable that the value of $C_{RH}$ be substantially a linear function of humidity.

Figure 6:
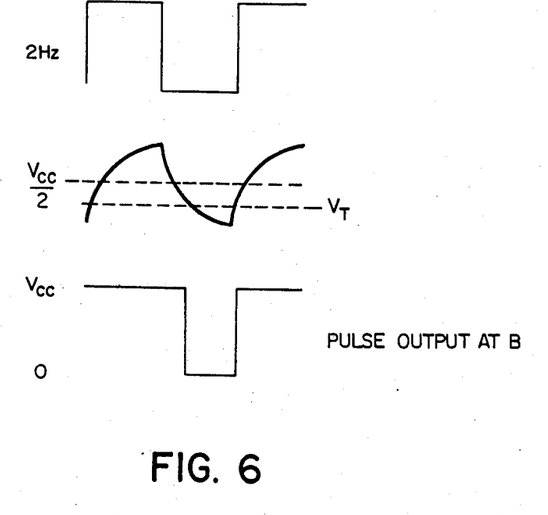
FIG. 6 is a diagram which indicates changes in pulse width proportional to changes in temperature in response to a logarithmic resistive temperature sensor.

Referring again to FIG. 2, the 2 Hz square wave applied to comparator 1 through R8 produces a pulse width proportional to temperature at the output of comparator 1 as shown in FIG. 6. This output pulse is modified by the output pulse from comparator 2 by averaging the latter with resistor R4 and capacitor C2 thus correcting $V_T$ in a manner proportional to the relative humidity.

Figure 5:
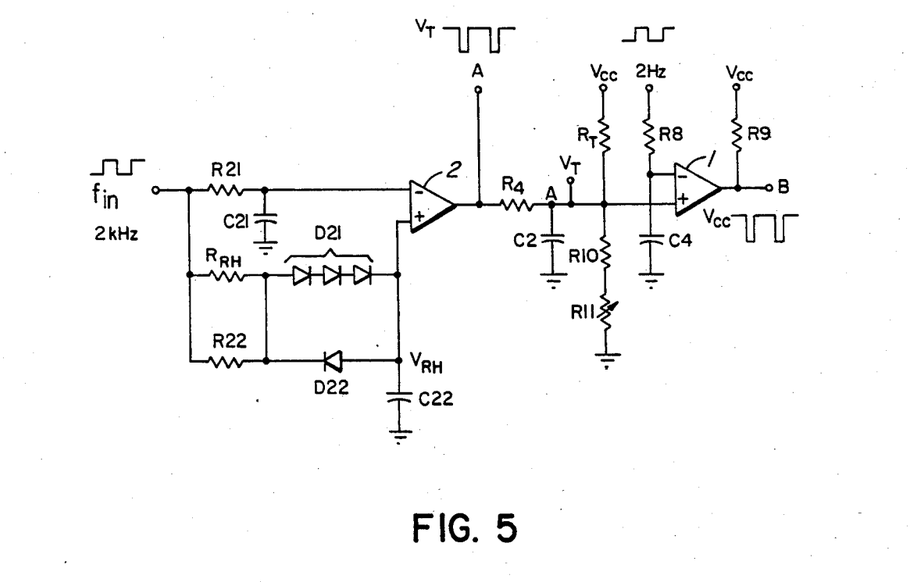
FIG. 5 is a circuit diagram, similar to FIG. 2 but including a logarithmic resistive humidity sensing element.

FIG. 5 is a circuit similar to FIG. 2 but wherein the humidity sensor is resistor $R_{RH}$. Those components functioning in a similar manner as in FIG. 2 have identical numerals.

Figure 4:
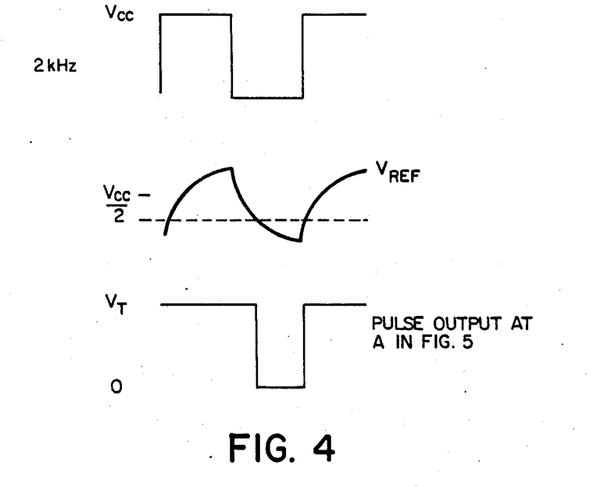
FIG. 4 is a diagram which indicates the changes in pulse width, due to changes in humidity in response to a logarithmic resistive humidity sensor.

The negative input terminal to the comparator 2 is provided with a reference waveform, $V_{ref}$, generated by a 2 kHz signal through resistor R21 to which is connected a capacitor C21. The same 2 kHz signal is connected to one end of a humidity sensing resistor $R_{RH}$ in parallel with R22 and through parallel diodes D21 and D22 to the positive terminal of the comparator 2. The diodes D21 together with capacitor C22 and D22 serve to convert the logarithmic signals developed in $R_{RH}$ to a linear signal $V_{RH}$. The combination of $V_{ref}$ and $V_{RH}$ produces a pulse width at output terminal A of comparator 2 which is proportional to RN (see FIG. 4).

It is to be observed from FIGS. 2 and 5 that the temp.T being sensed varies with RT as follows:

$$T \alpha \ln R_T$$

$\alpha$ pulse width at B
also pulse width at B X ln ($R_{10}$ and $R_{11}$)
It is to be observed from FIG. 2 that RH being sensed varies with $C_{RH}$ as follows:

$$RH \alpha C_{RH}$$

$\alpha$ pulse width at A
also pulse width at A modifies $R_{10}$ and $R_{11}$ in a logarithmic manner.
It is to be observed from FIG. 5 that RH being sensed varies with $R_{RH}$ as follows:

$$RH \alpha \log R_{RH}$$

$\alpha a$ pulse width at A
also the pulse width at A modifies $R_{10}$ and $R_{11}$ in a logarithmic manner.
Hence the output at B is modified linearly with changes in temperature and humidity.

R8 is selected to provide the correct change in pulse width with change in temperature.

R11 is adjusted to provide the resultant humidity/temperature pulse width to a selected calibration point.

For practical applications R4 is selected to cause the measured temperature to change approximately 1° F. for 10% change in RH.

Other embodiments falling within the terms of the appended claims will occur to those skilled in the art.

APPENDIX
NOMINAL CIRCUIT VALUES

| RESISTORS (IN OHMS) | | | | CAPACITORS (IN FARADS) | | | |
|---|---|---|---|---|---|---|---|
| FIG. 2 | | FIG. 5 | | FIG. 2 | | FIG. 5 | |
| R1 | 330K | R21 | 270K | C1 | 0.01 uF | C21 | 1n |
| R2 | 15K | R22 | 1 M | C2 | 2.2 u | C22 | 22 u |
| | | R4 | 4.7K | C4 | 0.68 u | C2 | 2.2 u |
| | | | | | | C4 | 0.6 u |
| R3 | 470K | R8 | 237K | $C^{RH}$ | 110-144 p | C4 | 0.68 u |
| R4 | 1.8K | R9 | 4.7K | | 0%-90% RH | | |
| | | R10 | 5.6K | | | | |
| | | R11 | 2.2K | | | | |

-continued

APPENDIX
NOMINAL CIRCUIT VALUES

| RESISTORS (IN OHMS) | | | CAPACITORS (IN FARADS) | |
|---|---|---|---|---|
| FIG. 2 | | FIG. 5 | FIG. 2 | FIG. 5 |
| R8 | 237K | $R_{RH}$ 15K–10 M | | |
| R9 | 4.7K | 90%–20% RH | | |
| R10 | 5.6K | | DIODES D21–D22 1N4148 | |
| R11 | 2.2K | | | |
| $R_T$ | 10K 25° C. | | | |

I claim:

1. A circuit for providing an output signal, indicative of temperature and humidity, for subsequent processing, said circuit comprising:
   (a) a first fixed resistor having a first terminal, adapted to have applied thereto a first A.C. drive signal with a fixed frequency of substantially square-shaped waveform, and having a second terminal;
   (b) a first capacitor having a first terminal, connected to said first fixed resistor second terminal, and having a second terminal;
   (c) a capacitive humidity sensing device connected to said first capacitor second terminal;
   (d) a first reference input terminal adapted to having applied thereto a reference signal;
   (e) a first comparator having a first input terminal connected to the junction of said first fixed resistor and said first capacitor, to receive the fixed frequency drive signal after the waveform thereof is modified to an amplitude voltage which varies as a function of the relative humidity sensed by said capacitive humidity sensing device, having a second input terminal connected to said reference signal input terminal to receive the reference signal, and having an output terminal, said first comparator having a first state in which the output terminal thereof is open circuited and a second state in which the output terminal thereof is held at a present voltage;
   (f) a second fixed resistor having a first terminal adapted to have applied thereto a second A.C. drive signal having a substantially square-shaped waveform and having a second terminal;
   (g) a second capacitor having a first terminal connected to said second resistor first terminal and having a second terminal adapted for connection to a first reference voltage point, the values of said second resistor and said second capacitor being selected to provide a preselected time constant;
   (h) a logarithmic temperature sensitive resistor having a first terminal adapted for connection to a first source of D.C. voltage and having a second terminal;
   (i) a further resistor having a first terminal connected to said logarithmic temperature sensitive resistor second terminal, and having a second terminal adapted for connection to the first reference voltage point;
   (j) a second comparator having a first input terminal connected to the junction of said logarithmic temperature sensitive resistor and said further resistor for receipt therefrom of a logarithmic varying temperature dependent voltage, having a second input terminal connected to the junction of said second resistor and said second capacitor for receipt therefrom of a logarithmically-shaped waveform, and having an output terminal, said second comparator having a first state in which the output terminal thereof is open circuited and a second state in which the output terminal thereof is held at a preset voltage;
   (k) a third fixed resistor having a first terminal connected to said first comparator output terminal and having a second terminal connected to said second comparator first input terminal;
   (l) a third capacitor having a first terminal connected to said third fixed resistor second terminal, and having a second terminal adapted for connection to the first reference voltage point, said third capacitor cooperating with said third fixed resistor to provide a humidity related shunt to said further resistor, the value of said third fixed resistor being selected to provide a preselected amount of humidity related bias to the temperature dependent voltage; and
   (m) an output resistor having a first terminal connected to said second comparator output terminal and having a second terminal adapted for connection to a second source of D. C. voltage, the junction of said second comparator output terminal and said output resistor first terminal providing a circuit output signal of a pulse waveform with a repetition rate related to that of the second A.C. drive signal and with a duty cycle which varies with temperature adjusted by the preselected amount of humidity related bias.

2. A circuit as claimed in claim 1 further comprising a further circuit output terminal connected to said first comparator output terminal for providing a humidity related output signal for further processing.

3. A circuit for providing an output signal, indicative of temperature and humidity, for subsequent processing, said circuit comprising:
   (a) a first fixed resistor having a first terminal, adapted to have applied thereto a first A.C. drive signal with a fixed frequency of substantially square-shaped waveform, and having a second terminal;
   (b) a first capacitor having a first terminal, connected to said first resistor second terminal, and having a second terminal, adapted for connection to a first reference voltage point;
   (c) a humidity sensitive resistor having a first terminal, adapted to have applied thereto the first A.C. drive signal, and having a second terminal;
   (d) first diode means having an anode terminal, connected to said humidity sensitive resistor second terminal, and having a cathode terminal;
   (e) second diode means having a cathode terminal, connected to the junction of said humidity sensitive resistor second terminal and said first diode means anode terminal, and having an anode terminal;

(f) a first comparator having a first input terminal, connected to said first diode means cathode terminal and to said second diode means anode terminal, having a second input terminal connected to the junction of said first fixed resistor second terminal and said first capacitor first terminal for receipt therefrom of a substantially sawtooth shaped reference voltage, and having an output terminal, said first comparator having a first state in which the output terminal thereof is open circuited and having a second state in which the output terminal thereof is held at a preset voltage level;

(g) a second capacitor having a first terminal, connected to said comparator first input terminal, and having a second terminal, adapted for connection to the first reference voltage point, the first comparator first input terminal receiving an input voltage varying with the humidity sensed by said humidity sensitive resistor;

(h) a second fixed resistor having a first terminal, connected to said humidity sensitive resistor first terminal, and having a second terminal, connected to said humidity sensitive resistor second terminal, to adjust the effect of said humidity sensitive resistor on said first comparator;

(i) a third fixed resistor having a first terminal adapted to have applied thereto a second A.C. drive signal having a substantially square-shaped waveform and having a second terminal;

(j) a third capacitor having a first terminal connected to said third resistor first terminal and having a second terminal adapted for connection to a first reference voltage point, the values of said third resistor and said third capacitor being selected to provide a preselected time constant;

(k) a logarithmic temperature sensitive resistor having a first terminal adapted for connection to a first source of D.C. voltage and having a second terminal;

(l) a further resistor having a first terminal connected to said logarithmic temperature sensitive resistor second terminal, and having a second terminal adapted for connection to the first reference voltage point;

(m) a second comparator having a first input terminal connected to the junction of said logarithmic temperature sensitive resistor and said further resistor for receipt therefrom of a logarithmic varying temperature dependent voltage, having a second input terminal connected to the junction of said third resistor and said third capacitor for receipt therefrom of a logarithmically-shaped waveform, and having an output terminal, said second comparator having a first state in which the output terminal thereof is open circuited and a second state in which the output terminal thereof is held at a preset voltage;

(n) a fourth fixed resistor having a first terminal connected to said first comparator output terminal and having a second terminal connected to said second comparator first input terminal;

(o) a fourth capacitor having a first terminal connected to said fourth fixed resistor second terminal, and having a second terminal adapted for connection to the first reference voltage point, said fourth capacitor cooperating with said fourth fixed resistor to provide a humidity related shunt to said further resistor, the value of said fourth fixed resistor being selected to provide a preselected amount of humidity related bias to the temperature dependent voltage; and (p) an output resistor having a first terminal connected to said second comparator output terminal and having a second terminal adapted for connection to a second source of D.C. voltage, the junction of said second comparator output terminal and said output resistor first terminal providing a circuit output signal of a pulse waveform with a repetition rate related to that of the second A.C. drive signal and with a duty cycle which varies with temperature adjusted by the preselected amount of humidity related bias.

4. A circuit as claimed in claim 3 further comprising a first circuit output terminal connected to said first comparator output terminal for providing a humidity related output signal for further processing.

5. A humidity sensing circuit for providing an output signal for subsequent processing, said circuit comprising:

(a) a fixed resistor having a first terminal, adapted to have applied thereto an A.C. drive signal with a fixed frequency of substantially square shaped waveform, and having a second terminal;

(b) a capacitor having a first terminal connected to said fixed resistor second terminal and having a second terminal;

(c) a capacitive humidity sensing device connected to said first capacitor second terminal;

(d) a reference input terminal adapted to have applied thereto a reference signal;

(e) a comparator having a first input terminal connected to the junction of said fixed resistor and said capacitor to receive the fixed frequency drive signal after the waveform thereof is modified to an amplitude voltage which varies as a function of the relative humidity sensed by said capacitive humidity sensing device, having a second input terminal connected to said reference input terminal to receive the reference signal, and having an output terminal, said comparator having a first state in which the output terminal thereof is open circuited and a second state in which the output terminal thereof is held at a preset voltage, said comparator output terminal providing the circuit output signal of the fixed frequency with a duty cycle which varies as a function of the humidity sensed by said capacitive humidity sensing device.

6. A humidity sensing circuit for providing an output signal for further processing, said circuit comprising:

(a) an input terminal adapted to have applied theeto an A.C. drive signal with a fixed frequency of substantially square shaped waveform;

(b) a fixed resistor having a first terminal connected to said input terminal and having a second terminal;

(c) a resistive humidity sensing device having a first terminal connected to said input terminal and having a second terminal;

(d) a logarithmic conversion network having a first terminal connected to said resistive humidity sensing device second terminal; and (e) a comparator having a first comparator input terminal connected to said logarithmic conversion network second terminal, to receive the fixed frequency drive signal after the waveform thereof is modified to an amplitude voltage which varies as a function of the relative humidity sensed by said resistive humidity sensing device, having a second comparator input terminal connected to said fixed resistor second terminal to receive a reference signal therefrom, and having an output terminal, said comparator having a first state in which the output terminal thereof is open circuited and a second state in which the output terminal thereof is held at a preset voltage said comparator output terminal providing the circuit output signal of the fixed frequency with a duty cycle which varies as a function of the humidity sensed by said resistive humidity sensing device.

7. A circuit for providing an output signal, proportional to temperature, for subsequent processing, said circuit comprising:
(a) a first fixed resistor having a first terminal adapted to have applied thereto an A.C. drive signal having a substantially square-shaped waveform and having a second terminal;
(b) a first capacitor having a first terminal connected to said first resistor first terminal and having a second terminal adapted for connection to a reference voltage point, the values of said first resistor and said first capacitor being selected to provide a preselected time constant;
(c) a logarithmic temperature sensitive resistor having a first terminal adapted for connection to a first source of D.C. voltage and having a second terminal;
(d) a further resistor having a first terminal connected to said logarithmic temperature sensistive resistor second terminal, and having a second terminal adapted for connection to the first reference voltage point;
(e) a comparator having a first input terminal connected to the junction of said logarithmic temperature sensitive resistor and said further resistor for receipt therefrom of a logarithmic varying temperature dependent voltage, having a second input terminal connected to the junction of said first resistor and said first capacitor for receipt therefrom of a logarithmically-shaped waveform, and having an output terminal, said comparator having a first state in which the output terminal thereof is open circuited and a second state in which the output terminal thereof is held at a preset voltage;
(f) an output resistor having a first terminal connected to said comparator output terminal and having a second terminal adapted for connection to a second source of D.C. voltage, the junction of said second comparator output terminal and said output resistor first terminal providing a circuit output signal of a pulse waveform with a repetition rate related to that of the A.C. drive signal and with a duty cycle which varies substantially linearly with temperature.

8. A circuit for providing an output signal proportional to temperature, for subsequent processing, said circuit comprising:
(a) a comparator (1) having a first input terminal, a second input terminal, and an output terminal said comparator (1) having a first state in which said output terminal is open circuited and a second state wherein said output terminal is held at a reference voltage;
(b) a first A.C. drive source having a substantially square-shaped waveform, said source being applied to a first series circuit comprising a first resistor ($R_8$) and a first capacitor ($C_4$), the values of which are selected to provide a desired time constant, the junction between the said first resistor ($R_8$) and said first capacitor ($C_4$) providing a logarithmically-shaped waveform to the second input terminal of said comparator;
(c) a first source of D.C. voltage ($V_{cc}$) applied to a second series circuit including a logarithmic temperature sensitive resistor (RT) and a second resistor ($R_{10}$ and $R_{11}$) to provide a logarithmically varying temperature dependent voltage ($V_T$) to the first input terminal of said comparator (1);
(d) an output resistor ($R_9$) connected to said output terminal of said first comparator (1) and to a second source of D.C. voltage ($V_{cc}$), the output (B) of said first comparator (1) providing a pulse with a repetition rate related to that of said square-shaped waveform from said first A.C. drive source and a duty cycle wyich varies substantially linearly with temperature.

9. A circuit according to claim 8, further including a humidity sensing element (CRH), whereby said logarithmically varying temperature dependent voltage ($V_T$) provided to said first terminal of said first comparator by said temperature sensing resistor is provided with an adjustment by a humidity related shunt to said second resistor ($R_{10}$ and $R_{11}$), said circuit further including:
a second comparator (2) having first and second input terminals and an output terminal, said second comparator (2) having a first state in which said output terminal is open circuited and a second state wherein said output terminal is held at a reference voltage;
a third series circuit including a third resistor ($R_3$), a D.C. blocking capacitor ($C_1$), and said humidity sensing element (CRH), the junction of the said third resistor ($R_3$) and said blocking capacitor ($C_1$) being connected to said first input terminal of said second comparator (2);
a second A.C. drive source, having a substantially square-shaped waveform, applied to said third resistor ($R_3$), the said first terminal of said second comparator thereby receiving a signal having a substantially sawtooth waveform which varies in amplitude with humidity, said second comparator having a selected D.C. bias voltage ($V_{REF}$) provided to the second terminal thereof;
a fourth resistor ($R_4$), one terminal of which is connected to said output terminal of said second comparator and the other terminal of which is connected to said first terminal of said first comparator, said fourth resistor and a second capacitor ($C_2$) providing a humidity related shunt to said second resistor ($R_{10}$, $R_{11}$), the value of said fourth resistor being selected to provide the desired amount of humidity related bias to the temperature related voltage ($V_T$).

10. A circuit according to claim 9, further including an output connected to the output terminal of said second comparator to provide a humidity related signal (A) for subsequent utilization.

11. A circuit according to claim 8 further including a logarithmically varying resistive humidity sensing element ($R_{RH}$) whereby said logarithmic varying temperature dependent voltage ($V_T$) provided to said first terminal of said first comparator by said temperature sensing resistor (RT) is provided with an adjustment by a humidity related shunt, said circuit further including:

a second comparator (2) having first and second input terminals and an output terminal, said second comparator (2) having a first state in which said output terminal is open circuited and a second state wherein said output terminal is held at a reference voltage;

a fifth resistor having one end connected to receive a third A.C. drive source having a substantially square-shaped waveform, the other end of said fifth resistor being connected to said second terminal of said second comparator and to a fifth capacitor ($C_{21}$), the other end of said fifth capacitor being connected to a reference point, the said second terminal of said second comparator thus being provided with a substantially sawtooth shaped reference ($V_{REF}$), a humidity sensitive resistor ($R_{RH}$), one end of which is connected to receive said third A.C. drive source and the other end of which is connected to said first input terminal of said second comparator (2) in a positive direction through first silicon diode means ($D_{21}$) and in a negative direction through second diode means ($D_{22}$), with a fourth capacitor ($C_{22}$) connected from said first terminal of said second comparator to a reference point, the amplitude ($V_{RH}$) at said first terminal of said second comparator varying with the resistive value of said humidity sensitive resistor ($R_{RH}$) and hence, in a linear manner, with the humidity;

a sixth resistor ($R_{22}$) is connected across said humidity sensitive resistor ($R_{RH}$) in order to adjust the effect thereof on the humidity related output from said second comparator (2) in a desired manner.

12. A circuit according to claim 11, further including an output connected to said second comparator to provide a humidity related signal for subsequent utilization.

13. A humidity sensing circuit to provide an output signal for subsequent processing, said circuit comprising:

(a) a humidity sensing device having a first A.C. drive source applied thereto, said source having a fixed frequency of substantially square-shaped waveform;

(b) a comparator having a first input terminal which is connected to receive said fixed frequency source whose waveform is modified to an amplitude voltage which varies as a function of the relative humidity and a second input terminal which is connected to receive a reference signal, said comparator providing said output signal which has the same fixed frequency and a duty cycle which varies as a function of said humidity, wherein said humidity sensing device is capacitive and wherein said fixed frequency source is connected to said sensing device in series through a fixed resistor and a first capacitor, and wherein said first input terminal is connected to a junction point between said first resistor and said first capacitor.

14. A humidity sensing circuit to provide an output signal for subsequent processing, said circuit comprising:

(a) a humidity sensing device having a first A.C. drive source applied thereto, said source having a fixed frequency of substantially square-shaped waveform;

(b) a comparator having a first input terminal which is connected to receive said fixed frequency source whose waveform is modified to an amplitude voltage which varies as a function of the relative humidity and a second input terminal which is connected to receive a reference signal, said first comparator providing said output signal which has the same fixed frequency and a duty cycle which varies as a function of said humidity, wherein said humidity sensing device is resistive and wherein said fixed frequency drive source is connected to said second terminal of said comparator through a resistor and wherein said first terminal of said comparator is connected to a second capacitor, further including a logarithmic converter connected between said resistive sensing device and said first terminal of said first comparator, said converter providing a substantially D.C. signal to the first terminal of said first comparator.

* * * * *